United States Patent
Chiu et al.

(10) Patent No.: US 8,090,340 B2
(45) Date of Patent: *Jan. 3, 2012

(54) DOWN-CONVERTER AND CALIBRATION METHOD THEREOF

(75) Inventors: Chinq-Shiun Chiu, Hsinchu (TW); Jiqing Cui, Toa Payoh (SG)

(73) Assignee: Mediatek Inc., Hsin-Chu (TW)

( * ) Notice: Subject to any disclaimer, the term of this patent is extended or adjusted under 35 U.S.C. 154(b) by 431 days.

This patent is subject to a terminal disclaimer.

(21) Appl. No.: 12/429,579

(22) Filed: Apr. 24, 2009

(65) Prior Publication Data

US 2009/0203346 A1   Aug. 13, 2009

Related U.S. Application Data

(63) Continuation of application No. 11/469,944, filed on Sep. 5, 2006, now Pat. No. 7,542,751.

(60) Provisional application No. 60/749,518, filed on Dec. 12, 2005.

(51) Int. Cl.
*H04B 1/26* (2006.01)

(52) U.S. Cl. .................. 455/324; 455/226.1; 455/313

(58) Field of Classification Search .... 455/226.1–226.4, 455/67.11–67.14, 313–333
See application file for complete search history.

(56) References Cited

U.S. PATENT DOCUMENTS

| | | | |
|---|---|---|---|
| 5,233,311 A * | 8/1993 | Chevallier | 455/333 |
| 5,875,392 A | 2/1999 | Tanaka | |
| 6,115,593 A | 9/2000 | Alinikula et al. | |
| 6,516,187 B1 | 2/2003 | Williams et al. | |
| 6,785,530 B2 * | 8/2004 | Hatcher et al. | 455/326 |
| 6,989,705 B2 * | 1/2006 | Behzad | 455/333 |
| 7,106,095 B2 | 9/2006 | Kim et al. | |
| 7,215,196 B2 | 5/2007 | Banba et al. | |
| 7,356,317 B2 | 4/2008 | Xu et al. | |
| 7,366,486 B2 | 4/2008 | Vorenkamp et al. | |
| 7,423,699 B2 | 9/2008 | Vorenkamp et al. | |
| 2003/0194978 A1 | 10/2003 | Vorenkamp et al. | |
| 2004/0106380 A1 * | 6/2004 | Vassiliou et al. | 455/226.1 |
| 2004/0137870 A1 | 7/2004 | Kivekas | |
| 2004/0242178 A1 | 12/2004 | Kim et al. | |
| 2005/0118976 A1 | 6/2005 | Murakami et al. | |
| 2005/0170806 A1 | 8/2005 | Kim | |
| 2006/0068746 A1 * | 3/2006 | Feng et al. | 455/323 |
| 2006/0094395 A1 * | 5/2006 | Lee et al. | 455/284 |

* cited by examiner

*Primary Examiner* — Lana N Le

(74) *Attorney, Agent, or Firm* — Thomas|Kayden

(57) ABSTRACT

A mixer and calibration method thereof are provided. A direct conversion receiver comprises a differential loading pair utilizing at least one binary weighted resistor. The binary weighted resistor is adjustable to provide a resistance linear to a digital code, comprising a fixed resistor and an adjustable resistor cascaded to the fixed resistor in parallel. Every increment of the digital code induces an equal increment of the resistance. The magnitude of every incremental resistance is below a negligible ratio of the fixed resistor.

10 Claims, 7 Drawing Sheets

DOWN-CONVERTER AND CALIBRATION METHOD THEREOF

CROSS REFERENCE TO RELATED APPLICATIONS

This application is a continuation of U.S. patent application entitled "DOWN-CONVERTER AND CALIBRATION METHOD THEREOF," Ser. No. 11/469,944, filed on Sep. 5, 2006, which claims the priority of U.S. provisional application entitled "HIGH IIP2 CALIBRATION METHOD IN DCR", Ser. No. 60/749,518, filed on Dec. 12, 2005, the entirety of which are incorporated by reference herein.

BACKGROUND OF THE INVENTION

1. Field of the Invention

The invention relates to a direct conversion receiver, and in particular, to a calibration method for improving IIP2 characteristics in the direct conversion receiver.

2. Description of the Related Art

FIG. 1 shows a conventional $2^{nd}$ order input intercept point (IIP2) characterization. For a down-converter in a direct conversion receiver, RF input power and IF output power are measured. Input power is plotted along the horizontal axis, and output power is plotted along the vertical axis. The most dominant $2^{nd}$ order distortion source in a receiver is the down conversion stage, and a $2^{nd}$ order input intercept point (IIP2) is defined as a performance index. Mixers used in integrated direct conversion receivers are usually active transconductance mixers and nearly always balanced or double-balanced structures. A high IIP2 point is desirable for a direct conversion receiver. In a perfect balanced case, the IIP2 is infinite. Practically, however, mismatches of the components are inevitable, reducing the IIP2. Thus, compensation for the mismatches is required.

FIG. 2 shows a conventional mixer. A typical mixer model utilizes a differential loading pair comprising a $1^{st}$ load and a $2^{nd}$ load. Conventionally, mismatches of the components are unavoidable. For example, duty cycles of the local oscillation signals $V_{LO+}$ and $V_{LO-}$, amplitudes of the RF signals $V_{RF+}$ and $V_{RF-}$, parameters of $1^{st}$ switch and $2^{nd}$ switch, and resistances of $1^{st}$ load and $2^{nd}$ load may comprise erroneous inaccuracy, represented as follows: $A_{RF+} = A_{RF} \cdot (1+\Delta \times A_{RF}/2); A_{RF-} = A_{RF} \cdot (1-\Delta \times A_{RF}/2)$ (1)

where $A_{RF+}$ and $A_{RF-}$ are amplitudes of the RF signals $V_{RF+}$ and $V_{RF-}$, and $\Delta A_{RF}$ is their difference. $g_{m+} = g_m \cdot (1+\Delta \times g_m)/2; g_{m-} = g_m \cdot (1-\Delta \times g_m)/2$ (2)

where $g_{m+}$ and $g_{m-}$ are conductivities of the components in 220, and $\Delta g_m$ is their difference. $\eta_+ = \eta_{nom} \cdot (1+\Delta\eta/2); \eta_- = \eta_{nom} \cdot (1-\Delta\eta/2); \eta_{nom} = 50 \cdot \%$ (3)

where $\eta_+$ and $\eta_-$ are duty cycles of the local oscillation signals $V_{LO+}$ and $V_{LO-}$, and $\Delta\eta$ is their difference. $R_{L+} = R_L \cdot (1+\Delta \times R/2); R_{L-} = R_L \cdot (1-\Delta \times R/2)$ (4)

where $R_{L+}$ and $R_{L-}$ are the $1^{st}$ load and $2^{nd}$ load, and $\Delta R$ is their difference.

These mismatches are factors causing IIP2 reduction. Various calibration methods can compensate the mismatches. In an IEEE paper "Characterization of IIP2 and DC-Offsets in Transconductance Mixers", IIP2 is calculated as functions of load resistor imbalance and duty cycle mismatch, and the $\Delta R$ is tuned to optimize the IIP2 of a mixer. In another IEEE paper, Young-Jin Kim, "A GSM/EGSM/DCS/PCS Direct Conversion Receiver With Integrated Synthesizer", an adjustable resistor is provided for coarse and fine calibrations of the load mismatch. The load mismatch varies as a digital code of 8 bits. The variation of the load mismatch, however, is not linear to the digital code values, thus a wide range of trial digital codes are required to locate an optimum result. Further, the nonlinearity of the adjustable resistor may not permit sufficient accuracy for the mismatch compensation. Therefore, an enhanced architecture and calibration method are called for.

BRIEF SUMMARY OF THE INVENTION

A detailed description is given in the following embodiments with reference to the accompanying drawings.

An exemplary embodiment of a mixer is provided, utilized in a direct conversion receiver, comprising a differential loading pair utilizing at least one binary weighted resistor. The binary weighted resistor is adjustable to provide a resistance linear to a digital code, comprising a fixed resistor and an adjustable resistor cascaded to the fixed resistor in parallel. Every increment of the digital code induces an equal increment of the resistance. The magnitude of every incremental resistance is below a negligible ratio of the fixed resistor.

The digital code is represented by a first number of bits. The adjustable resistor comprises the first number of unit resistors each corresponding to one of the digital code bits, and the unit resistors corresponding to bit state 1 are conducted in parallel to form the equivalent resistance of the adjustable resistor, whereas those corresponding to bit state 0 are unconnected.

Resistances of the unit resistors can be defined as: $R_n = R_t \cdot 2^{2n} D$ where n is the bit order counting from 0 to the first number m; $R_n$ is the $n^{th}$ group of unit resistors counting from LSB side; $R_t$ is the fixed resistor, and D is the magnitude of the incremental resistance. The negligible ratio is $\frac{1}{2^m}$.

A calibration method based on the mixer architecture is also provided. First, the digital code is set to a first value, such that a first mismatch of the differential loading pair induces the mixer to output a first DC offset. Thereafter, the digital code is set to a second value, such that a second mismatch of the differential loading pair induces the mixer to output a second DC offset. A two dimensional linear relationship between the mismatches and the DC offsets is established based on the first and second mismatches and DC offsets. An interpolation is performed on the two dimensional linear relationship to determine a third mismatch that corresponds to zero DC offset. A third digital code is generated from the third mismatch to be the calibration result.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
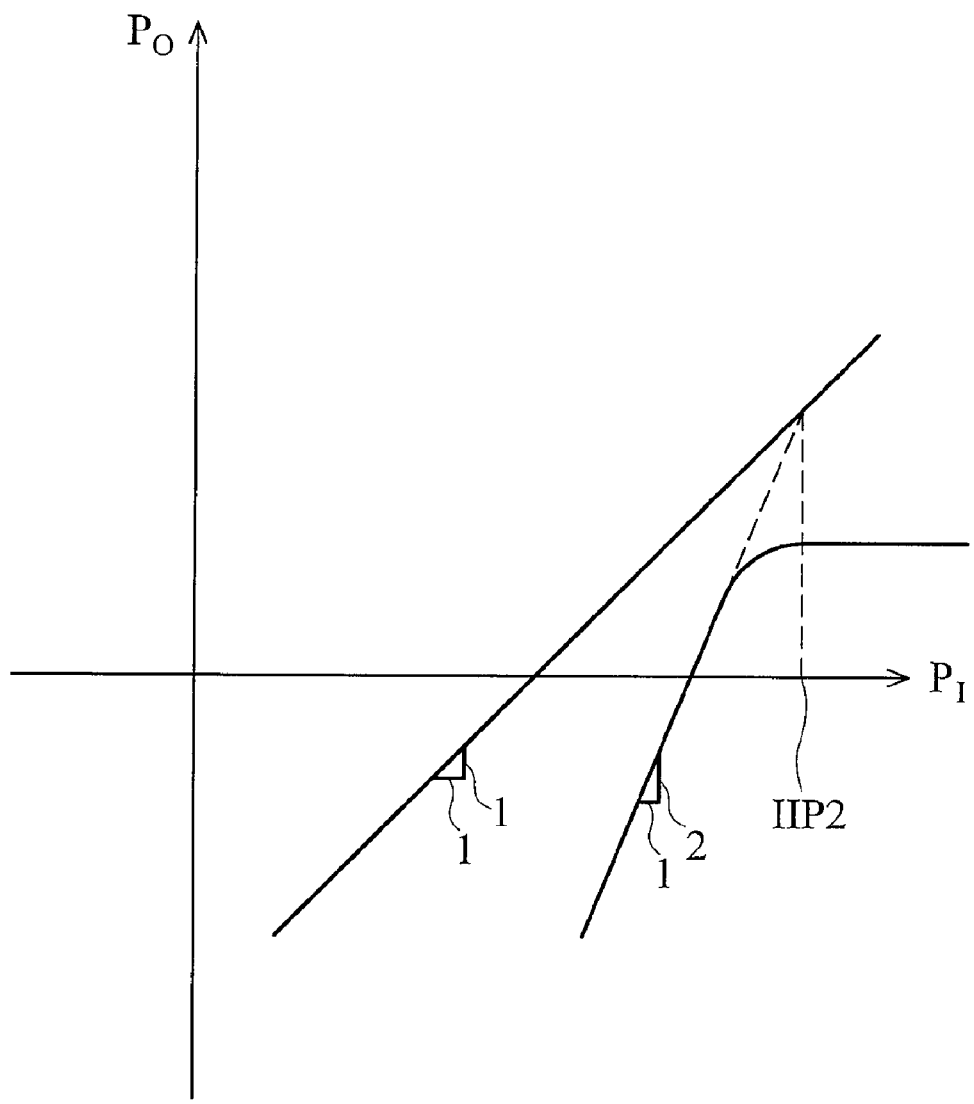
FIG. 1 shows a conventional IIP2 characterization.
Figure 2:
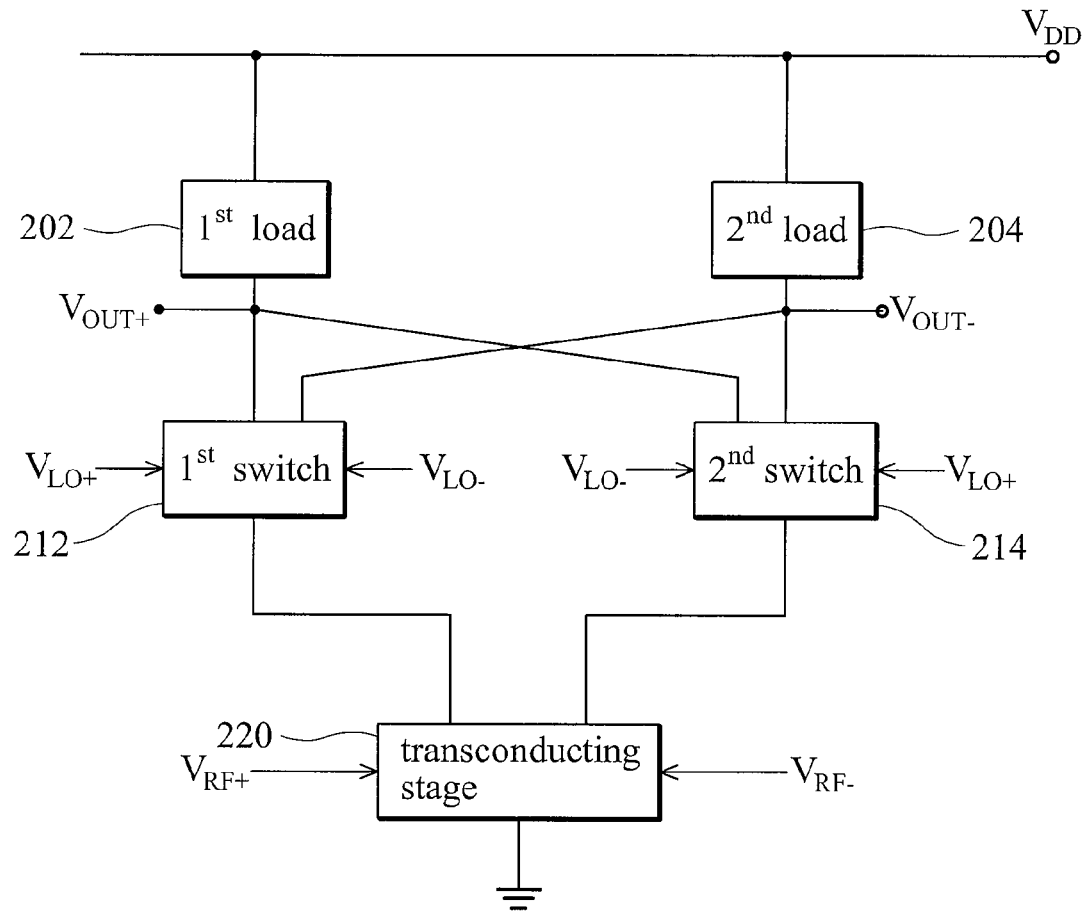
FIG. 2 shows a conventional mixer.
Figure 3A:
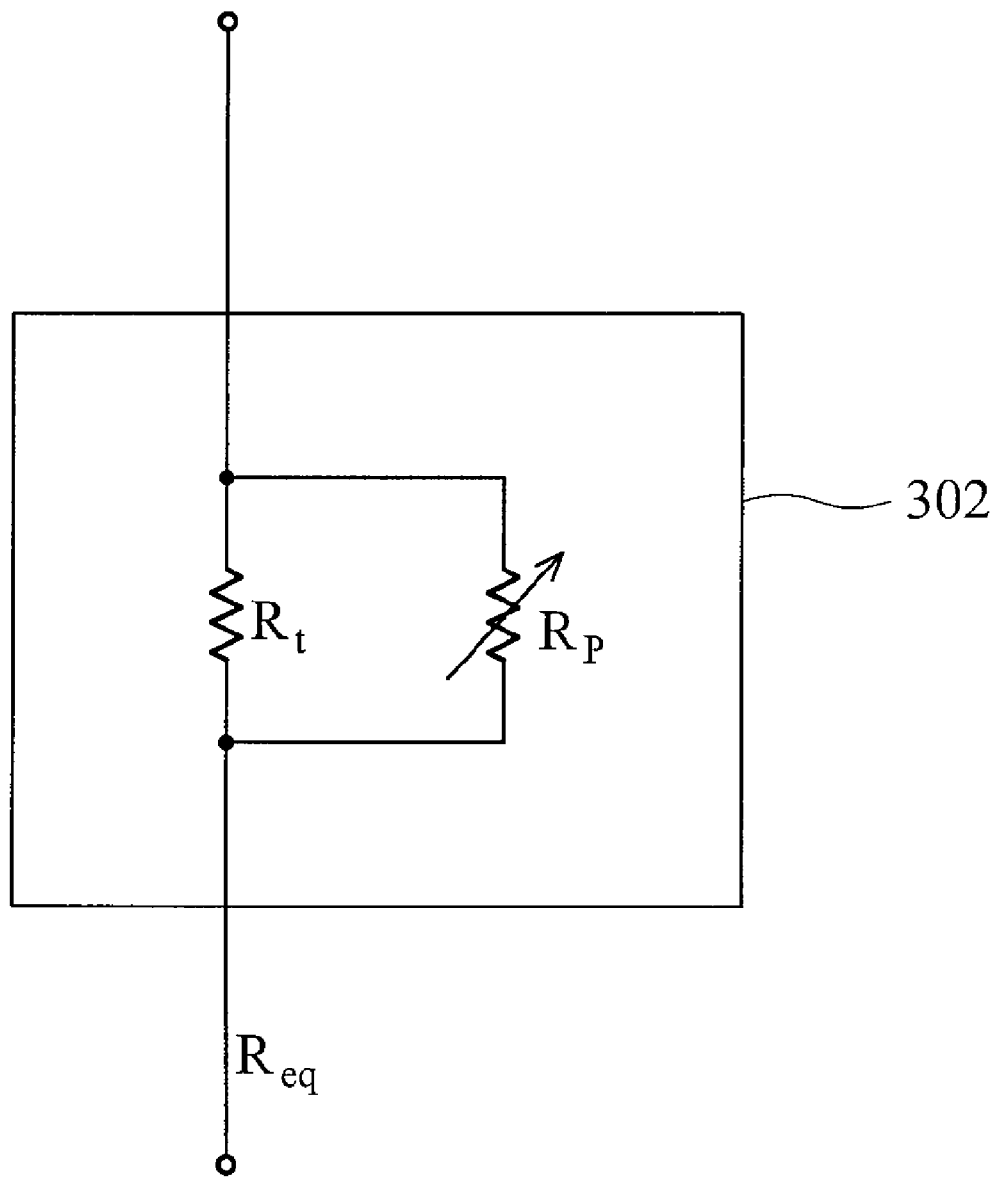
FIGS. 3a and 3b show embodiments of adjustable resistors.

FIG. 3a shows an embodiment of an adjustable resistor. In FIG. 3a, an improved version of binary weighted resistor 302 is provided as a substitution of the 1st load or 2nd load in FIG. 2. The binary weighted resistor 302 comprises a fixed resistor $R_t$, and an adjustable resistor $R_p$. The $R_t$ and $R_p$ are connected in parallel to form an equivalent resistance $R_{eq}$. In the embodiment, the $R_{eq}$ is designed to be binary weighted, having a linear relationship with a digital code. The digital code may be an 8-bit value, and every increment of the digital code induces an equal increment of the $R_{eq}$. Taking two bits for example, When the digital code=0, Bit1=0 and Bit0=0, $R_{eq}(0)=R_t$; (5) When the digital code=1, Bit1=0 and Bit0=1, $R_{eq}(1)=R_t//R_{p0}$ (6) When the digital code=2, Bit1=1 and Bit0=0, $R_{eq}(2)=R_t//R_{p1}$ (7) When the digital code=3, Bit1=1 and Bit0=1, $R_{eq}(3)=R_t//R_{p1}//R_{p0}$ (8)

Each increment D is defined to be equal in the embodiment, that is:

$$D = R_{eq}(1) - R_{eq}(0) = R_{eq}(2) - R_{eq}(1) = R_{eq}(3) - R_{eq}(2) \quad (9)$$

As a result, $R_{p0} = R_t^2/D - R_t$ (10) $R_{p1} = R_t^2/2D - R_t$ (11) $R_{p1}//R_{p0} = R_t^2/3D - R_t$ (12)

And a conclusion can be found that: $R_i = R_t^2/i{*}D - R_t$ (13) where $R_i$ means an $i^{th}$ equivalent $R_p$ corresponding to an $i^{th}$ digital code, and an $i^{th}$ $R_{eq}$ can be written in generalized form:

$$R_{eq}(i) = R_i // R_t = R_t - i{*}D \quad (14)$$

Figure 3B:
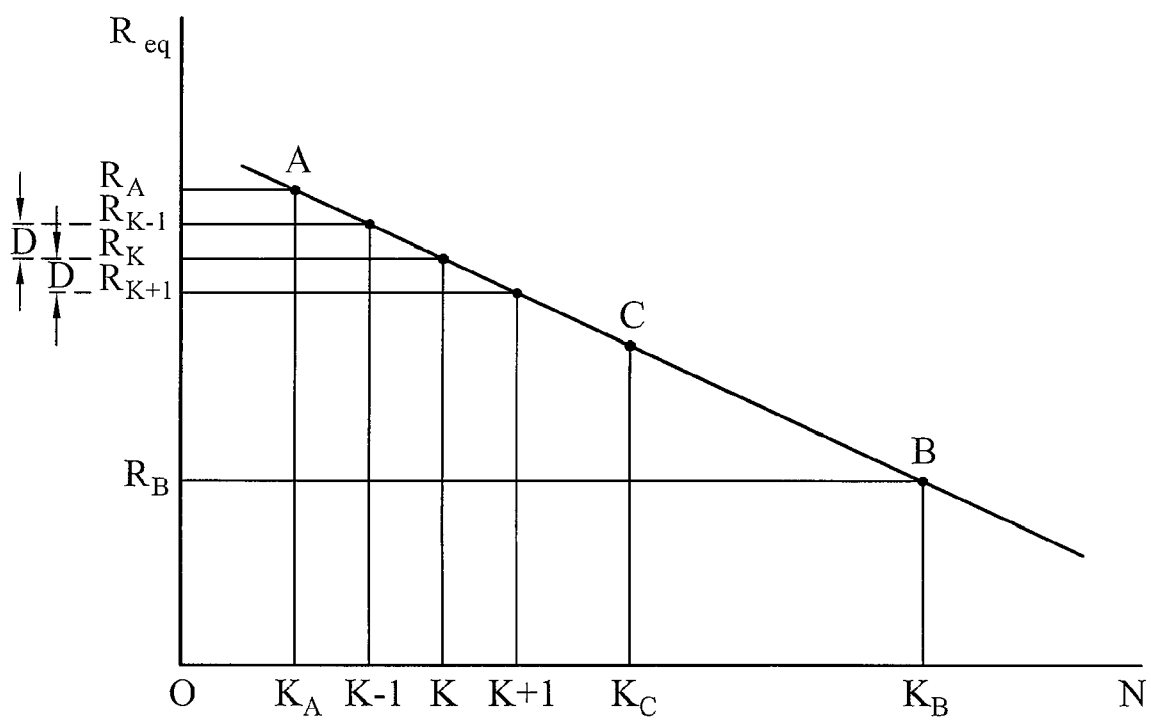

FIG. 3b shows the linear relationship between digital code and the adjustable resistor according to equation (14). When the digital code is $K_A$, a corresponding $R_{eq}$ is $R_A$. Likewise, when the digital code is $K_B$, the corresponding $R_{eq}$ is $R_B$. Every increment of the digital code induces a variation D of the $R_{eq}$.

Figure 4:
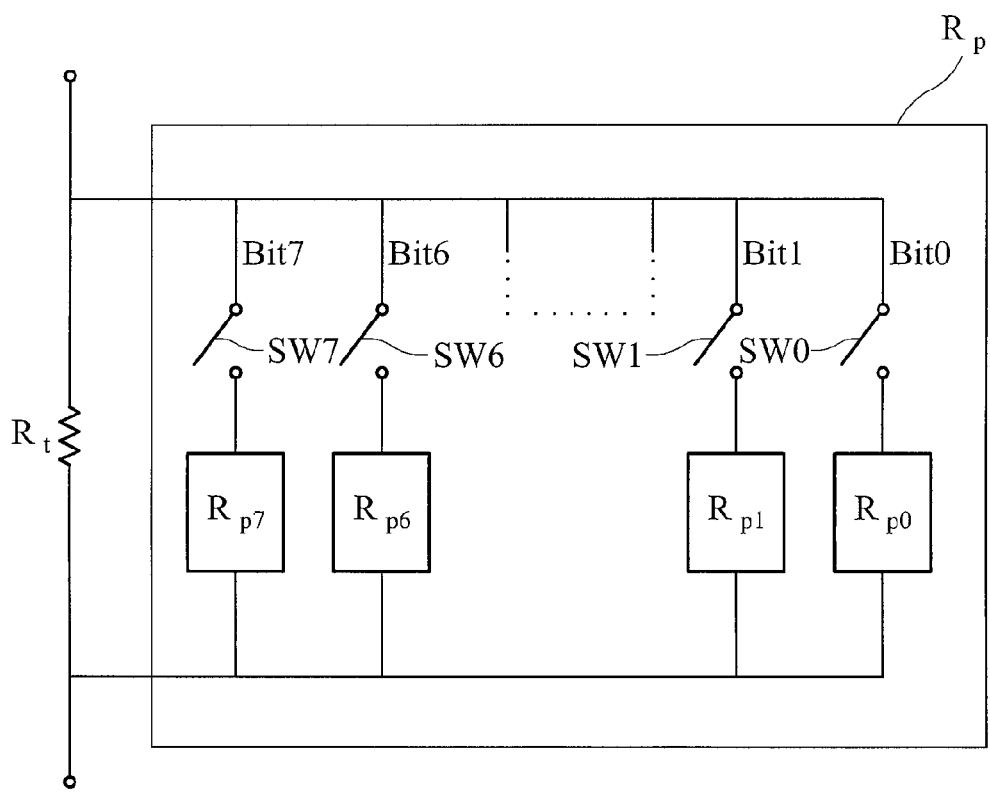
FIG. 4 shows a linear relationship between digital code and the adjustable resistor according to an embodiment of the invention.

FIG. 4 shows an embodiment of the $R_p$, comprising eight groups of unit resistors $R_{p0}$ to $R_{p7}$, each corresponding to a bit. Switches SW0 to SW7 are turned on or off in response to the corresponding bit of the digital code, such that the unit resistors corresponding to bit state 1 are conducted in parallel to form the adjustable resistor $R_p$. To implement the linear $R_{eq}$ as described in FIGS. 3a and 3b, some approximation is made to the equations. For example, the increment value D is selected to be negligible small in comparison to $R_t$:

$$D << R_t/i_{max} \quad (15)$$

where $i_{max}$ is the maximum of the digital code, such as $2^8$ in this case.

Thus, the $R_i$ can be rewritten in an approximated form:

$$R_i = R_t^2/i{*}D - R_t \approx R_t^2/i{*}D \quad (16)$$

Hence, the unit resistors $R_{p0}$ to $R_{p7}$ are specifically designed to be the values, $R_t^2/D$, $R_t^2/2D$, $R_t^2/4D$, ..., and $R_t^2/128D$. Since the increment value D is selected to be relatively small, the linearity of $R_{eq}$ and digital code as shown in FIG. 3b can be approximated.

Figure 5:
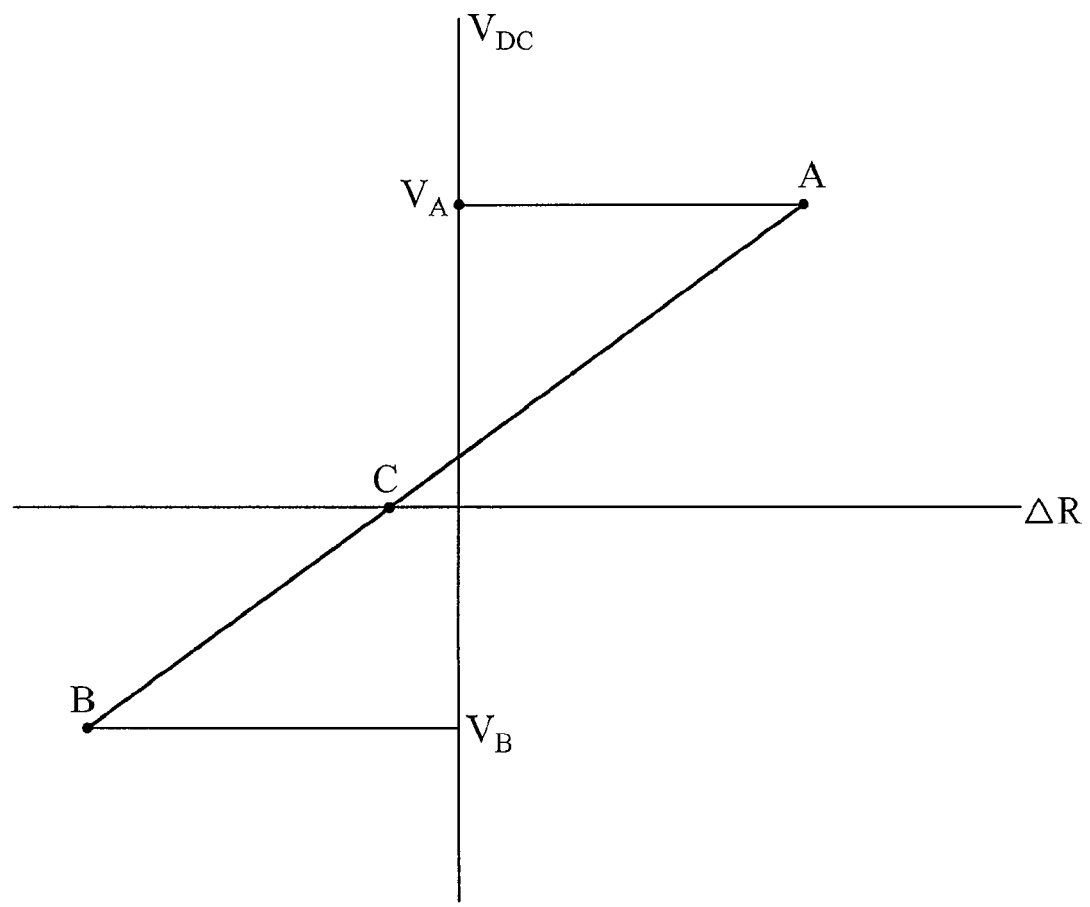
FIG. 5 shows a linear relationship between resistance mismatch and DC offset of the mixer.

FIG. 5 shows linear relationship between resistance mismatch and DC offset of the mixer. As known, DC offset of the Vout+ and Vout− in FIG. 2 can be estimated as a function of the component mismatches, represented as: $V_{DC} = 1\,2 \times R_L \times \eta_{nom} \times g_m \times \alpha_2' \times A_{RF}^2 \cdot f[\Delta\eta \cdot f(\Delta \times \times g_m + \Delta \times \times A_{RF}) + \Delta \times \times R \cdot f(1 + \Delta \times \times g_m \times \Delta \times \times A_{RF})]$ (17)

where $\alpha_2$ is a coefficient of the second order distortion. If the parameters in equation (17) except $\Delta R$, are treated as constants, formula (17) can be simplified as: $V_{DC} = A \cdot \Delta R + B$ (18)

where A and B are constants, showing a linear relationship between the $V_{DC}$ and the $\Delta R$ as FIG. 5. Practically, $V_{DC}$ is a measurable value proportional to IIP2. If the $\Delta R$ can be selected to make the $V_{DC}$ zero, the corresponding IIP2 can also be optimized. Thus, by utilizing the binary weighted resister shown in FIG. 3a, an embodiment of IIP2 calibration is provided.

Figure 6:
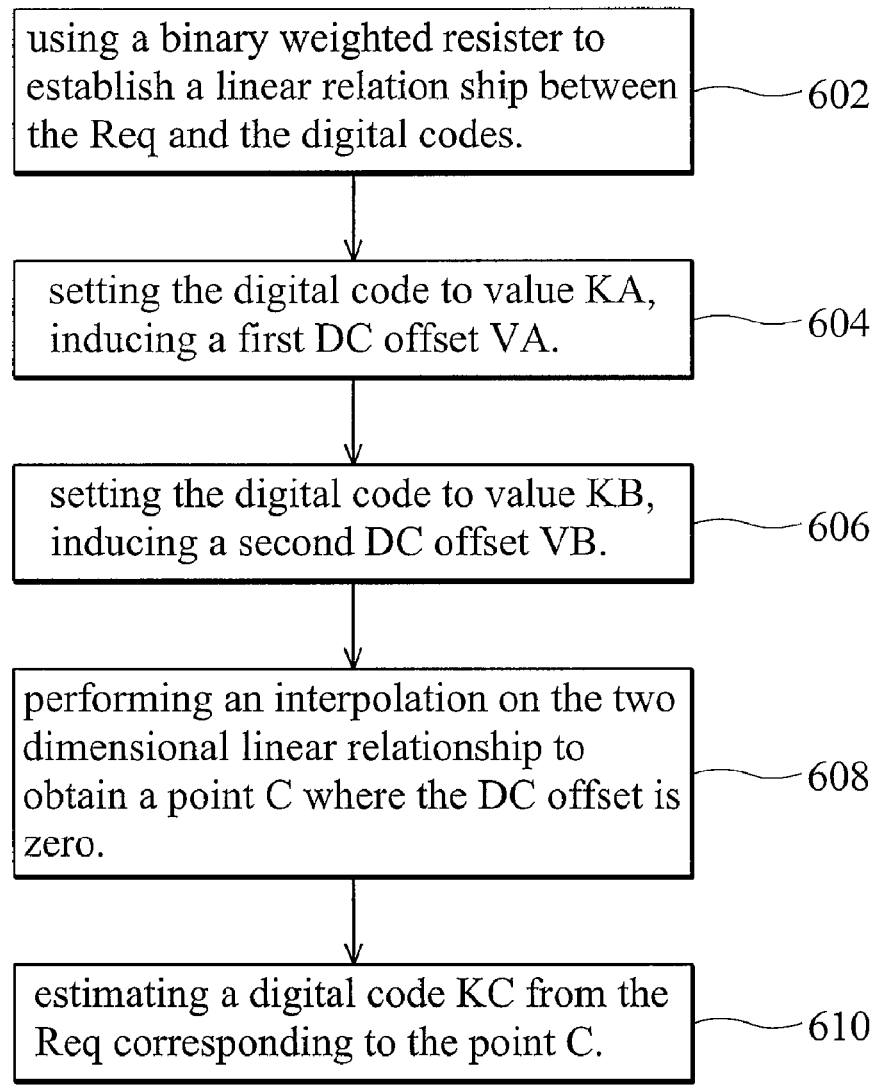
FIG. 6 is a flowchart of a calibration according to the invention.

FIG. 6 is a flowchart of the calibration method. In step 602, a binary weighted resister is provided as shown in FIG. 3a, to establish a linear relationship between the $R_{eq}$ and the digital codes as shown in FIG. 3b. In step 604, the digital code is set to value $K_A$, such that the value of $R_{eq}$ is $R_A$, inducing a first DC offset $V_A$. Likewise, in step 606, the digital code is set to value $K_B$, thus the corresponding $R_B$ induces a second DC offset $V_B$. In step 608, an interpolation is performed on the two dimensional linear relationship as shown in FIG. 5. According to the interpolation, a point C where the DC offset is zero, can be found, and the corresponding $\Delta R$ is obtained. In step 610, with the $\Delta R$ obtained, $R_{eq}$ corresponding to point C is also obviously calculated and linearly mapped to a digital code $K_C$ in FIG. 3b. In this embodiment, the digital code $K_C$ is recorded as a calibration result.

Mixers are mass produced in the factory. With the binary weighted resistor and calibration method disclosed, component mismatches can be efficiently compensated by marking a simple digital code. Calibration accuracy is increased using high resolution incremental $R_{eq}$, and the computational complexity is reduced by taking advantage of the linearity approximations. The binary weighted resistor can be implemented to substitute one or both of the loads 202 and 204, and the digital code is not limited to 8 bits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed:

1. A calibration method for a direct conversion receiver, wherein:
    the direct conversion receiver comprises a mixer having a differential loading pair; and
    the differential loading pair comprises a binary weighted resistor having adjustable resistance with a linear relationship to a digital code;

the calibration method comprises:
- setting the digital code to a first value, such that a first mismatch of the differential loading pair induces the mixer to output a first DC offset;
- setting the digital code to a second value, such that a second mismatch of the differential loading pair induces the mixer to output a second DC offset;
- establishing a two dimensional linear relationship between the mismatches and the DC offsets based on the first and second mismatches and DC offsets;
- performing an interpolation on the two dimensional linear relationship to determine a third mismatch corresponding to a minimum DC offset; and
- generating a third digital code from the third mismatch to be the calibration result.

2. The calibration method as claimed in claim 1, wherein:
every increment of the digital code induces an equal increment of the resistance; and
the magnitude of every incremental resistance is below a negligible ratio of the fixed resistor.

3. The calibration method as claimed in claim 2, wherein:
the digital code is represented by a first number of bits;
the adjustable resistor comprises the first number of unit resistors each corresponding to one of the digital code bits; and
the unit resistors corresponding to bit state 1 are conducted in parallel to equivalently form the adjustable resistor, whereas those corresponding to bit state 0 are unconnected.

4. The calibration method as claimed in claim 3, wherein resistances of the unit resistors are defined as:

$$R_n = \frac{R_f^2}{2^n \cdot D}$$

where n is the bit order from 0 to the first number m;
$R_n$ is the $n^{th}$ unit resistor counting from LSB side;
$R_f$ is the fixed resistor, and
D is the magnitude of the incremental resistance.

5. The calibration method as claimed in claim 4, wherein the negligible ratio is $1/2^m$.

6. A mixer utilized in a direct conversion receiver, the mixer comprising a differential loading pair utilizing at least one binary weighted resistor; wherein the binary weighted resistor is adjustable to provide a resistance linear to a digital code, the differential loading pair comprising:
- a fixed resistor; and
- an adjustable resistor selectively coupled to the fixed resistor in parallel;
- wherein for at least two subsequent increments, each of the two increments of the digital code induces a substantially equal increment of the resistance.

7. The mixer as claimed in claim 6, wherein:
the digital code is represented by a first number of bits;
the adjustable resistor comprises the first number of unit resistors each corresponding to one of the digital code bits; and
the unit resistors corresponding to bit 1 are conducted in parallel to form the equivalent resistance of the adjustable resistor, whereas those corresponding to bit 0 are unconnected.

8. The mixer as claimed in claim 7, wherein resistances of the unit resistors are defined as:

$$R_n = \frac{R_f^2}{2^n \cdot D}$$

where n is the bit order from 0 to the first number m;
$R_n$ is the $n^{th}$ unit resistor counting from LSB side;
$R_f$ is the fixed resistor, and
D is the magnitude of the incremental resistance.

9. The mixer as claimed in claim 6, wherein each incremental resistance of the two subsequent increments is below a negligible ratio of the fixed resistor.

10. The mixer as claimed in claim 9, wherein the negligible ratio is $1/2^m$.

* * * * *